Patented Aug. 13, 1940

2,211,079

UNITED STATES PATENT OFFICE 2,211,079

LAMINATED TEXTILE

George Schneider, Montclair, N. J., assignor to Celanese Corporation of America, a corporation of Delaware No Drawing. Application April 8, 1938, Serial No. 200,901

16 Claims. (Cl. 154—2)

This invention relates to the manufacture of fabrics, especially laminated fabrics suitable for the production of stiff and semi-stiff collars, cuffs and other wearing apparel and to industrial articles.

This application is a continuation-in-part of my application S. No. 40,561 filed September 14, 1935 which has resulted in U. S. Patent No. 2,126,823.

An object of the invention is to prepare fabrics of any desired degree of increased stiffness and in a simple and expeditious manner. Another object of the invention is to prepare laminated fabrics having a colored fabric on at least one surface. Other objects of the invention will appear from the following detailed description.

An important method of making fabrics of the kind referred to above involves uniting one or more layers of fabric composed of non-thermoplastic material, for example cotton, wool or linen, to an adjacent or intermediate layer of fabric containing cellulose acetate or other thermoplastic derivative of cellulose, by the application of heat and pressure in the presence of a volatile assisting liquid. The volatile assisting liquid is a liquid which acts on the cellulose derivative at the pressing temperature to assist adhesion and which, apart from any substantially non-volatile constituents intended to remain permanently in the materials, is sufficiently volatile to be vaporized substantially completely during the pressing step.

According to the present invention there is employed as the assisting liquid a volatile liquid mixture which is not a solvent for the cellulose derivative at ordinary temperatures but becomes one at elevated temperatures and which contains a liquid which is a solvent for the cellulose derivative at ordinary temperatures. Thus, the assisting liquids of the invention comprise one or more true solvents for the cellulose derivative in admixture with one or more diluents therefor, all the constituents of the mixture, with the exception of any substantially non-volatile substances, being sufficiently volatile to be removed substantially completely at the temperature at which union is effected. Plasticizers and other substantially non-volatile constituents which are required to remain permanently in the materials, e. g. white or colored pigments and metallic powders, may be dissolved or suspended in the assisting liquid but substances insufficiently volatile to be removed from the material during the pressing step yet sufficiently volatile to evaporate from the materials subsequently, should not be present.

Among true solvents for cellulose acetate which may be employed in the assisting liquid, special mention may be made of acetone. Other useful solvents include methyl and ethyl acetate, dioxane and methylene ethylene ether. As diluents, liquids which themselves develop solvent properties for the cellulose derivative at elevated temperatures, for example in the case of cellulose acetate lower alcohols such as methanol, ethanol and isopropanol, are particularly suitable. Liquids which are without solvent properties for the cellulose derivative even at elevated temperatures, for example water, may also be present. In general the boiling points of the various constituents of the liquid mixture (with the exception of plasticizers or other substantially non-volatile constituents) should not be substantially in excess of 100° C. and should preferably not exceed 120° C. A very suitable assisting liquid for use with cellulose acetate is a 20 or 30–40% solution of acetone in methanol, ethanol or a mixture of the two. Such a liquid may contain small proportions of water, for example 4 or 5–10%, but substantially larger proportions are undesirable.

The use of the assisting liquids of the invention enables firm adhesion to be obtained between fabrics of non-thermoplastic material such as cotton or linen and fabrics containing thermoplastic cellulose derivatives such as cellulose acetate at temperatures between 120 and 180° C. without causing undesirable fusing of the cellulose derivative such as would lead to impermeability of the resulting fabric to air or moisture and without adversely affecting the fastness of dyeings on the component fabrics. Certain assisting liquids which would otherwise be satisfactory for the production of stiffened fabrics appear to affect the fastness of certain dyeings on cotton and cellulose acetate, particularly those affected by the use of vat dyes. This difficulty is avoided, however, by the use of the assisting liquids of the invention.

It is of advantage to have present during union of the component fabrics a plasticizer for the cellulose derivative. The plasticizer may be applied to the cellulose derivative-containing fabric or to the fabric of non-thermoplastic material prior to the application of the assisting liquid. On the other hand, as indicated above, a suitable content of plasticizer may be dissolved in the assisting liquid. Thus, for example, in any of the liquid mixtures referred to above there may be dissolved 3 or 4–8 or 10% of triacetin, diacetin, dimethyl phthalate, dimethyl tartrate, diethyl tartrate, dibutyl tartrate, di-ethoxyethyl phthalate or other suitable plasticizers. Plasticizers which are to some extent soluble in water and particularly triacetin, are to be preferred. A very suitable mixture consists of 30 parts of acetone, 70 parts of industrial spirit (ethanol containing 4 or 5% of methanol and 5.10% water) and 5 parts of triacetin. The relative amounts of the various components may be varied somewhat, for instance, an assisting liquid may contain 25–35% acetone, 55–65% ethanol, 3–5% methanol and 4–8% water, the percentages being by weight, and to every 100 parts by volume of this mixture there may be added from 3–10 parts of a plasticizer such as triacetin. A part or all of the 25–35% acetone may be replaced by another suitable active solvent for the thermoplastic material. When less active solvents are employed in place of acetone a larger percentage of same may be used. Plasticizers such as tricresyl phosphate and triphenyl phosphate which are substantially lacking in affinity for water are preferably employed if at all only in admixture with water-soluble plasticizers. Sulphonamides and sulphanilides, for example paratoluene-sulphonamide and para-sulphanilide, have a sufficient affinity for water but their use may be undesirable at high pressing temperatures owing to discoloration.

The cellulose derivative is preferably present in yarn form in admixture with yarns of cotton or other non-thermoplastic textile fiber in the fabric layer which is to be united to the layer or layers of non-thermoplastic material. The use as the intermediate fabric layer of such a mixed fabric enables air permeability in the final product to be easily obtained, particularly when in the intermediate fabric the cellulose derivative yarns form only a small proportion, for example 20–30% of the total yarns. The invention, however, includes the use of intermediate fabrics containing a considerably larger proportion of cellulose derivative yarns, for example 50–60 or 70 or even 100%. The intermediate fabric layer is preferably a woven fabric but may be knitted or netted.

Instead of using as the intermediate layer a fabric containing yarns of cellulose acetate or other thermoplastic derivative of cellulose there may be employed a fabric of non-thermoplastic material impregnated or coated with the cellulose derivative and preferably containing also a plasticizer; suitable intermediate fabric layers of this type can be made, for example, by dipping a cotton fabric into a solution containing cellulose acetate and a plasticizer in a volatile solvent and evaporating the solvent, or by spraying a cotton fabric with a similar solution or by the application to a cotton fabric of a suspension of a cellulose derivative in a volatile non-solvent therefor. Where permeability to air and water is not required in the final product, the intermediate layer may comprise a film or foil of cellulose derivative. Cellulose derivative in powder form, for example in the form of a powder containing a plasticizer, may also be employed in uniting the two non-thermoplastic fabric layers.

The invention is preferably carried out by assembling the various components of the composite fabric, wetting both sides of the assembly with the volatile assisting liquid, for example by padding, dipping or spraying and immediately thereafter applying the desired heat and pressure, for example, by means of a heated platen press. As indicated above, the temperature at which pressing is effected may range between 120° and 180° C. according to the nature of the cellulose derivative employed, the proportion of plasticizer therein and the composition of the volatile assisting liquid. In general, the nearer the composition of the volatile assisting liquid approaches that of a true solvent for the cellulose derivative at ordinary temperatures, the lower the temperature required in pressing. Care should be taken, however, that the proportion of true solvent in the assisting liquid is not unduly high when permeability to air and moisture is required in the final product.

The component fabrics of the assembly may be cut to shape at a convenient stage before pressing, for example, after assembly and before application of the assisting liquid; or any desired cutting may be affected after pressing, or even during pressing, with the aid of a punch or cutter forming part of the press. When cutting is effected before pressing, the layers may be stitched together before the application of the assisting liquid. The invention also includes the use of an assembly of fabric layers woven together and interconnected by extra warp or weft threads.

Soft shirts having stiff or semi-stiff collars or cuffs may be made according to the invention by forming one layer of the collar or cuff integral with the body of the garment, super-imposing on this layer the interlining and an outer layer, applying the assisting liquid and pressing the assembly to unite the components thereof.

In making stiff or semi-stiff collars, cuffs, fronts and the like or fabrics suitable for the production of such articles, an assembly of three layers is to be preferred, the intermediate layer being a fabric composed of or containing the cellulose derivative and the outer layers being composed of silk, cotton, linen or other non-thermoplastic textile material. The laminated fabrics made according to the invention may, however, comprise more than three layers. Thus, for example, fabrics of utility in the manufacture of shoes may be built up from a larger number of plies of non-thermoplastic material alternating with material comprising a cellulose derivative. On the other hand, the invention includes the production of a two-ply fabric in which a layer of non-thermoplastic material is united to a layer of material containing a thermoplastic derivative of cellulose. The stiffened fabrics of the invention may be shaped during the pressing operation. Brassières and similar articles may be formed in this way. The invention also includes uniting under heat and pressure in the presence of the assisting liquid of the invention two or more layers of fabric each of which contains or is composed of a thermoplastic derivative of cellulose. In this way collars or cuffs having a facing of cellulose acetate or other organic derivative of cellulose can be made. To preserve the desired appearance of the outer fabric in this case a plasticizer for the cellulose derivative may be contained in the intermediate fabric layer but not in the outer layer.

The invention has been described with particular reference to the use of cellulose acetate as the thermoplastic cellulose derivative. Other suitable cellulose derivatives may be employed, however, for example other simple esters of cellulose such as cellulose formate, propionate, butyrate, mixed esters, for instance cellulose acetate, propionate, acetate butyrate, acetate nitrate and acetate nitrate butyrate, ether-esters, for instance ethyl cellulose acetate and oxyethyl cellulose acetate, cellulose ethers, for instance ethyl, methyl and benzyl cellulose and in cases where inflammability is not objectionable, cellulose nitrate. Moreover, there may be substituted for the cellulose derivative other highly polymeric thermoplastic filament-forming substances, particularly ethers and esters such, for example, as vinyl acetate, vinyl chloracetate and other vinyl esters, vinyl ethers and filament-forming bases of a similar nature formed from other unsaturated esters, for instance, acrylic and alkylacrylic esters.

It is to be understood that the foregoing detailed description is merely given by way of illustration and that many variations may be made therein without departing from the spirit of my invention.

Having described my invention, what I desire to secure by Letters Patent is:

1. Process for the production of laminated fabrics which comprises uniting at least one layer of textile fabric to a self-sustaining layer of material which contains a thermoplastic filament-forming ester or ether by the action of heat and pressure in the presence of a liquid mixture which is not a solvent for the filament-forming base at ordinary temperatures but becomes one at elevated temperatures, said liquid mixture containing 20 to 40% of a true solvent for the filament-forming base, at least the major part of said liquid mixture being sufficiently volatile to vaporize during the pressing step, and no constituent of said liquid mixture being of such volatility as to remain in the materials after pressing but be lost by evaporation thereafter.

2. Process for the production of laminated fabrics which comprises uniting a plurality of layers of textile fabric at least one of which contains an organic derivative of cellulose by the action of heat and pressure in the presence of a liquid mixture which is not a solvent for the derivative of cellulose at ordinary temperatures but becomes one at elevated temperatures, said liquid mixture containing 20 to 40% of a true solvent for the derivative of cellulose, at least the major part of said liquid mixture being sufficiently volatile to vaporize during the pressing step, and no constituent of said liquid being of such volatility as to remain in the materials after pressing but be lost by evaporation thereafter.

3. Process for the production of laminated fabrics which comprises uniting a plurality of layers of textile fabric at least one of which contains cellulose acetate by the action of heat and pressure in the presence of a liquid mixture which is not a solvent for the cellulose acetate at ordinary temperatures but becomes one at elevated temperatures, said liquid mixture containing 20 to 40% of a true solvent for the cellulose acetate, at least the major part of said liquid mixture being sufficiently volatile to vaporize during the pressing step, and no constituent of said liquid mixture being of such volatility as to remain in the materials after pressing but be lost by evaporation thereafter.

4. Process for the production of laminated fabrics which comprises uniting two layers of non-thermoplastic textile fabric to an intermediate layer of fabric containing a thermoplastic filament-forming ester or ether by the action of heat and pressure in the presence of a plasticizer for the filament-forming base and of a liquid mixture which is not a solvent for the filament-forming base at ordinary temperatures but becomes one at elevated temperatures, said liquid mixture containing 20 to 40% of a true solvent for the filament-forming base, at least the major part of said liquid mixture being sufficiently volatile to vaporize during the pressing step, and no constituent of said liquid mixture being of such volatility as to remain in the materials after pressing but be lost by evaporation thereafter.

5. Process for the production of laminated fabrics which comprises uniting two layers of non-thermoplastic textile fabric to an intermediate layer of fabric containing cellulose acetate by the action of heat and pressure in the presence of a plasticizer for the cellulose acetate and of a liquid mixture which is not a solvent for the cellulose acetate at ordinary temperatures but becomes one at elevated temperatures, said liquid mixture containing 20 to 40% of a true solvent for the cellulose acetate, at least the major part of said liquid mixture being sufficiently volatile to vaporize during the pressing step, and no constituent of said liquid mixture being of such volatility as to remain in the materials after pressing but be lost by evaporation thereafter.

6. Process for the production of laminated fabrics which comprises uniting two layers of non-thermoplastic textile fabric to an intermediate layer of fabric containing yarns of an organic derivative of cellulose by the action of heat and pressure in the presence of a plasticizer for the cellulose derivative and of a liquid mixture which is not a solvent for the organic derivative of cellulose at ordinary temperatures but becomes one at elevated temperatures, said liquid mixture containing 20 to 40% of a true solvent for the organic derivative of cellulose, at least the major part of said liquid mixture being sufficiently volatile to vaporize during the pressing step, and no constituent of said liquid mixture being of such volatility as to remain in the materials after pressing but be lost by evaporation thereafter.

7. Process for the production of laminated fabrics which comprises uniting two layers of non-thermoplastic textile fabric to an intermediate layer of fabric containing yarns of cellulose acetate by the action of heat and pressure in the presence of a plasticizer for the cellulose acetate and of a liquid mixture which is not a solvent for the cellulose acetate at ordinary temperatures but becomes one at elevated temperatures, said liquid mixture containing 20 to 40% of a true solvent for the cellulose acetate, at least the major part of said liquid mixture being sufficiently volatile to vaporize during the pressing step, and no constituent of said liquid mixture being of such volatility as to remain in the materials after pressing but be lost by evaporation thereafter.

8. Process for the production of laminated fabrics which comprises uniting a plurality of layers of textile fabric at least one of which contains cellulose acetate by the action of heat and pressure in the presence of a plasticizer for the cellulose acetate and a 20–40% solution of acetone in an alcohol selected from the group consisting of methanol, ethanol and propanol, and in the absence of substances of such volatility as to remain in the materials after pressing but be lost by evaporation thereafter.

9. Process for the production of laminated fabrics which comprises uniting two layers of non-thermoplastic textile fabric to an intermediate layer containing cellulose acetate by the action of heat and pressure in the presence of a plasticizer for the celluose acetate and a 20–40% solution of acetone in an alcohol selected from the group consisting of methanol, ethanol and propanol, and in the absence of substances of such volatility as to remain in the materials after pressing but be lost by evaporation thereafter.

10. Process for the production of laminated fabrics which comprises uniting two layers of non-thermoplastic textile fabric to an intermediate layer containing yarns of cellulose acetate by the action of heat and pressure in the presence of a plasticizer for the cellulose acetate and a 20-40% solution of acetone in an alcohol selected from the group consisting of methanol, ethanol and propanol, and in the absence of substances of such volatility as to remain in the materials after pressing but be lost by evaporation thereafter.

11. Process for the production of laminated fabrics which comprises uniting two layers of non-thermoplastic textile fabric to an intermediate layer containing cellulose acetate by the action of heat and pressure in the presence of a liquid mixture containing approximately 30 parts by volume of acetone, 70 parts by volume of industrial spirit and 5 parts by volume of triacetin, in the absence of substances of such volatility as to remain in the materials after pressing but be lost by evaporation thereafter.

12. Process for the production of laminated fabrics which comprises uniting two layers of non-thermoplastic textile fabric to an intermediate layer containing yarns of cellulose acetate by the action of heat and pressure in the presence of a liquid mixture containing approximately 30 parts by volume of acetone, 70 parts by volume of industrial spirit and 5 parts by volume of triacetin, and in the absence of substances of such volatility as to remain in the materials after pressing but be lost by evaporation thereafter.

13. Process for the production of laminated fabrics which comprises uniting two layers of non-thermoplastic textile fabric to an intermediate layer containing cellulose acetate by the action of pressure at a temperature between 120 and 180° in the presence of a liquid mixture containing approximately 30 parts by volume of acetone, 70 parts by volume of industrial spirit and 5 parts by volume of triacetin, and in the absence of substances of such volatility as to remain in the materials after pressing but be lost by evaporation thereafter.

14. Process for the production of laminated fabrics which comprises uniting two layers of non-thermoplastic textile fabric to an intermediate layer containing yarns of cellulose acetate by the action of pressure at a temperature between 120 and 180° in the presence of a liquid mixture containing approximately 30 parts by volume of acetone, 70 parts by volume of industrial spirit and 5 parts by volume of triacetin, and in the absence of substances of such volatility as to remain in the materials after pressing but be lost by evaporation thereafter.

15. Process for the production of laminated fabrics which comprises uniting two layers of non-thermoplastic fabric to an intermediate layer of fabric containing an organic derivative of cellulose by the action of heat and pressure in the presence of an assisting liquid containing 25-35% acetone, 55-65% ethanol, 3-5% methanol and 4-8% water by weight and to every 100 parts of said mixture by volume 3-10 parts triacetin.

16. Process for the production of laminated fabrics which comprises uniting two layers of non-thermoplastic fabric to an intermediate layer of fabric containing cellulose acetate by the action of heat and pressure in the presence of an assisting liquid containing 25-35% acetone, 55-65% ethanol, 3-5% methanol and 4-8% water by weight and to every 100 parts of said mixture by volume 3-10 parts triacetin.

GEORGE SCHNEIDER.